(12) United States Patent
Mao et al.

(10) Patent No.: US 10,666,939 B2
(45) Date of Patent: May 26, 2020

(54) METHOD AND APPARATUS FOR PROCESSING VIDEO BITRATE, STORAGE MEDIUM, AND ELECTRONIC DEVICE

(71) Applicant: TENCENT TECHNOLOGY (SHENZHEN) COMPANY LIMITED, Shenzhen, Guangdong (CN)

(72) Inventors: Xunan Mao, Shenzhen (CN); Chenchen Gu, Shenzhen (CN); Yongfang Shi, Shenzhen (CN); Anlin Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/308,600

(22) PCT Filed: Aug. 30, 2017

(86) PCT No.: PCT/CN2017/099595
§ 371 (c)(1),
(2) Date: Dec. 10, 2018

(87) PCT Pub. No.: WO2018/059175
PCT Pub. Date: Apr. 5, 2018

(65) Prior Publication Data
US 2019/0182480 A1    Jun. 13, 2019

(30) Foreign Application Priority Data

Sep. 27, 2016  (CN) .......................... 2016 1 0856103

(51) Int. Cl.
*H04N 19/105* (2014.01)
*H04N 19/146* (2014.01)
(Continued)

(52) U.S. Cl.
CPC ......... *H04N 19/105* (2014.11); *H04N 19/115* (2014.11); *H04N 19/146* (2014.11);
(Continued)

(58) Field of Classification Search
CPC .. H04N 19/105; H04N 19/115; H04N 19/146; H04N 19/159; H04N 19/172; H04N 19/177; H04N 7/147
(Continued)

(56) References Cited

U.S. PATENT DOCUMENTS

2002/0136297 A1* 9/2002 Shimada ............... H04N 19/176
375/240.04
2004/0037357 A1* 2/2004 Bagni ..................... G06T 9/005
375/240.15

(Continued)

FOREIGN PATENT DOCUMENTS

CN    101188752 A    5/2008
CN    101198042 A    6/2008
(Continued)

OTHER PUBLICATIONS

Communication dated Jan. 11, 2019 from the State Intellectual Property Office of the P.R.C. in counterpart Application No. 201610856103.7.
(Continued)

*Primary Examiner* — Christopher S Kelley
*Assistant Examiner* — Asmamaw G Tarko
(74) *Attorney, Agent, or Firm* — Sughrue Mion, PLLC (57) ABSTRACT

A method and an apparatus for processing a video bitrate, a storage medium, and an electronic device are provided. The method is performed by at least one processor and includes acquiring a number of video frames included in a current group of pictures, a starting frame of the current group of pictures being a current I frame, acquiring a target bitrate of
(Continued)

the current I frame, based on the number of the video frames included in the current group of pictures, and encoding the current I frame, based on the target bitrate.

17 Claims, 4 Drawing Sheets

(51) Int. Cl.
    *H04N 19/177*     (2014.01)
    *H04N 19/172*     (2014.01)
    *H04N 19/115*     (2014.01)
    *H04N 19/159*     (2014.01)
    *H04N 7/14*     (2006.01)

(52) U.S. Cl.
    CPC ......... *H04N 19/159* (2014.11); *H04N 19/172* (2014.11); *H04N 19/177* (2014.11); *H04N 7/147* (2013.01)

(58) Field of Classification Search
    USPC ........................................................ 375/240
    See application file for complete search history.

(56) References Cited

U.S. PATENT DOCUMENTS

| | | | | |
|---|---|---|---|---|
| 2006/0227868 | A1* | 10/2006 | Chen | H04N 19/139 375/240.03 |
| 2008/0232459 | A1* | 9/2008 | Auyeung | H04N 19/147 375/240.01 |
| 2015/0349915 | A1 | 12/2015 | Eum | |
| 2015/0373328 | A1* | 12/2015 | Yenneti | H04N 19/61 375/240.03 |

FOREIGN PATENT DOCUMENTS

| | | |
|---|---|---|
| CN | 100591124 C | 2/2010 |
| CN | 103179394 A | 6/2013 |

OTHER PUBLICATIONS

International Search Report of PCT/CN2017/099595 dated Nov. 29, 2017.

\* cited by examiner

METHOD AND APPARATUS FOR PROCESSING VIDEO BITRATE, STORAGE MEDIUM, AND ELECTRONIC DEVICE

CROSS-REFERENCE TO RELATED APPLICATIONS

This application is a U.S. national stage application under 35 U.S.C. § 371 of International Patent Application No. PCT/CN2017/099595 filed on Aug. 30, 2017, which claims priority from Chinese Patent Application No. 2016108561037, entitled "METHOD AND APPARATUS FOR PROCESSING VIDEO BITRATE," and filed in the Chinese Patent Office on Sep. 27, 2016, which are incorporated herein by reference in their entireties.

BACKGROUND

1. Field

Methods and apparatuses consistent with embodiments relate to the field of videos, and in particular, to a method and an apparatus for processing a video bitrate, a storage medium, and an electronic device.

2. Description of Related Art

Bitrate control during video play has a significant influence on the video quality, and improper allocation of an I frame bitrate affects the subjective quality of a whole video. If the I frame bitrate is excessively high, and a gap between the I frame quality and the non-I frame quality is relatively large, subjective flicker and incoherence may be caused. Moreover, an I frame of an excessively high bitrate may cause network impact, resulting in a delay and packet loss, and causing a video freeze. If the I frame bitrate is excessively low, the encoding quality of an I frame is degraded, and a subjective defect may be caused. Moreover, because of an inter-frame prediction feature of video encoding, the subsequent non-I frame quality of the I frame is also affected by the I frame quality, degrading the entire quality of a video. Therefore a bitrate allocation strategy of the I frame is a factor for the bitrate stationarity and the video compression efficiency.

In related technologies, there are also three control solutions for a bitrate:

Related technology 1: fixed QP offsets of an I frame and a non-I frame are set. During bitrate control, a bitrate is allocated to only the non-I frame, a QP is set according to the allocated bitrate, and the QP may be adjusted in a frame in real time. A QP of the I frame is an average QP of a non-I frame in a previous GOP minus a QP offset, and the QP of the I frame is not adjusted any more in an intra-frame. H.264 reference software uses such an I frame bitrate allocation method. However, disadvantages of the solution are: (1) for a relatively still sequence, an I frame bitrate is much higher than a non-I frame bitrate, and an I frame produces a bitrate peak in real-time communications, causing network impact; and (2) the fixed QP offsets used for the I frame and the non-I frame cannot meet requirements of different scenarios.

Related technology 2: a same bitrate allocation strategy is performed on each frame according to a buffer. An advantage lies in that an I frame bitrate is relatively low, the bitrate peak is relatively small, and the bitrate is stationary. X264 uses such a bitrate allocation method. However, a disadvantage of the solution is that the I frame, as a reference frame, has a relatively low bitrate, degrading the entire compression quality of the video. For a relatively still video chat scenario, when the frame bitrate is relatively low, the quality may be much lower than the non-I frame, causing an apparent subjective quality defect.

Related technology 3: first, a bitrate rate of an I frame of a current GOP to a P\B frame is allocated according to an actual bitrate rate of an I frame of the previous GOP to a P\B frame, and the bitrate allocation rate is adjusted with reference to a quantization step. Using an IPPP structure as an example, an I frame target bitrate of the current GOP/a P frame average target bitrate=(an I frame bitrate of the previous GOP/a P frame average bitrate of the previous GOP)*(an I frame quantization step of the previous GOP/a P frame average quantization step of the previous GOP). Then, a largest target bitrate of the I frame is limited according to a remaining bitrate in the buffer. However, disadvantages of the solution are: (1) the I frame bitrate allocation method in a first step converges to that the I frame and the P frame use a same quantization step, without considering different impacts of the I frame and the P frame on the video compression efficiency, or without considering the impact of different GOP sizes on the bitrate stationarity; and (2) in a second step, the largest bitrate of the I frame is limited. A largest value is set according to only the bitrate in the buffer, without considering an actual encoding situation. An I frame bitrate cannot be effectively lowered for some scenarios, and an I frame bitrate allocated to other scenarios may be excessively low, affecting the video quality.

SUMMARY

According to embodiments, there is provided a method for processing a video bitrate, the method being performed by at least one processor, and the method including acquiring a number of video frames included in a current group of pictures, a starting frame of the current group of pictures being a current I frame, acquiring a target bitrate of the current I frame, based on the number of the video frames included in the current group of pictures, and encoding the current I frame, based on the target bitrate.

According to embodiments, there is provided an apparatus for processing a video bitrate, the apparatus including at least one memory configured to store computer program code, and at least one processor configured to access the at least one memory and operate according to the computer program code. The computer program code includes first acquiring code configured to cause the at least one processor to acquire a number of video frames included in a current group of pictures, a starting frame of the current group of pictures being a current I frame, second acquiring code configured to cause the at least one processor to acquire a target bitrate of the current I frame, based on the number of the video frames included in the current group of pictures, and encoding code configured to cause the at least one processor to encode the current I frame, based on the target bitrate.

According to embodiments, there is provided a non-transitory computer-readable storage medium storing instructions that cause at least one processor to acquire a number of video frames included in a current group of pictures, a starting frame of the current group of pictures being a current I frame, acquire a target bitrate of the current I frame, based on the number of the video frames included in the current group of pictures, and encode the current I frame, based on the target bitrate.

DETAILED DESCRIPTION OF EMBODIMENTS

To make a person skilled in the art understand the solutions in this application better, the following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification, claims, and the foregoing accompanying drawings of this application, the terms "first," "second," and so on are intended to distinguish between similar objects rather than describe a specific order or a chronological order. Data used in this way can be interchanged in an appropriate case, so that the embodiments of this application that are described herein can be implemented in a sequence other than those sequences shown in the figures or described herein. In addition, terms, "including" and "having," and any variation thereof, are intended to cover non-exclusive inclusion, for example, a series of steps are included, or a process, method, system, and product of a unit, or a device is not necessarily limited to listed steps or units, and can include another step or unit that is not clearly listed or is inherent to the process, method, product, or device.

First, some nouns or terms that appear during descriptions of the embodiments of this application are applicable to the following explanations:

QP (Quantization parameter): a quantization parameter;

GOP (Group of Pictures): a group of video frames that begins with an I frame;

I frame: an intra-frame predicted frame, only using intra-frame prediction; and

Non-I frame: an inter-frame predicted frame, capable of using intra-frame prediction and inter prediction.

According to an embodiment of this application, an embodiment of a method for processing a video bitrate is provided.

Figure 1:
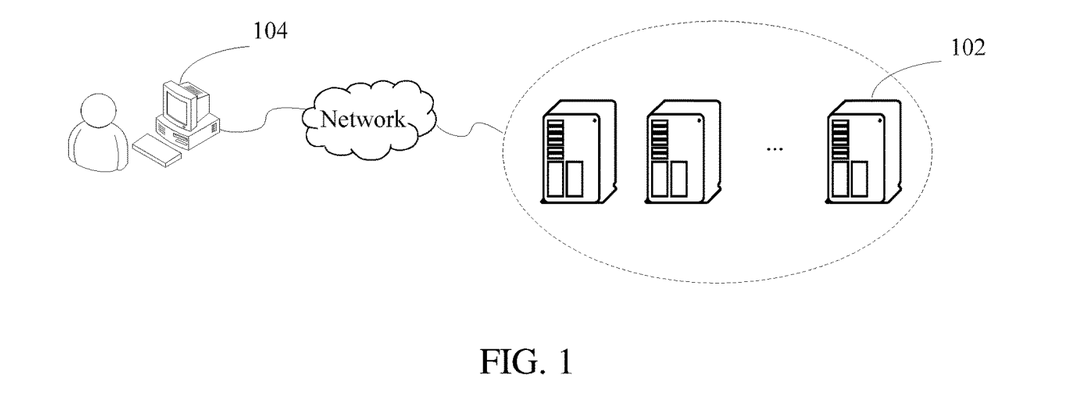
FIG. 1 is a schematic diagram of a hardware environment of a method for processing a video bitrate according to an embodiment of this application.

FIG. 1 is a schematic diagram of a hardware environment of a method for processing a video bitrate according to an embodiment of this application. In this embodiment, the foregoing method for processing a video bitrate may be applied to a hardware environment including a server 102 and a terminal 104 as shown in FIG. 1. As shown in FIG. 1, the server 102 is connected to the terminal 104 by using a network. The network includes, but is not limited to, a wide area network, a metropolitan area network, or a local area network. The terminal 104 is not limited to a PC, a mobile phone, a tablet computer, or the like. The method for processing a video bitrate in this embodiment of this application may be performed by the server 102, may be performed by the terminal 104, or may be performed by the server 102 and the terminal 104 together. The terminal 104 performs the method for processing a video bitrate in this embodiment of this application, or the method may be performed by a client installed on the terminal 104.

In an optional application scenario, the method for processing a video bitrate is performed by a client installed on a terminal, the client may be an instant application client, and a form of the terminal is not limited. During video calling between two clients, a first client records a video by using a camera of a first terminal, the recorded video includes a plurality of video frame groups, each group of pictures includes a plurality of frames, and a starting frame of each group of pictures is an I frame. The first client synchronously encodes the plurality of frames in each group of pictures during recording the video. Before encoding, a target bitrate is determined. When the target bitrate is determined, an I frame bitrate of each group of pictures is determined according to the number of the video frames in the set. After the target bitrate is determined, the I frame in the group of pictures is encoded according to the target bitrate. After encoding, encoded video frame information is transmitted to a second client. The second client may display the group of pictures by decoding, thereby implementing the video calling between the two clients.

Figure 2:
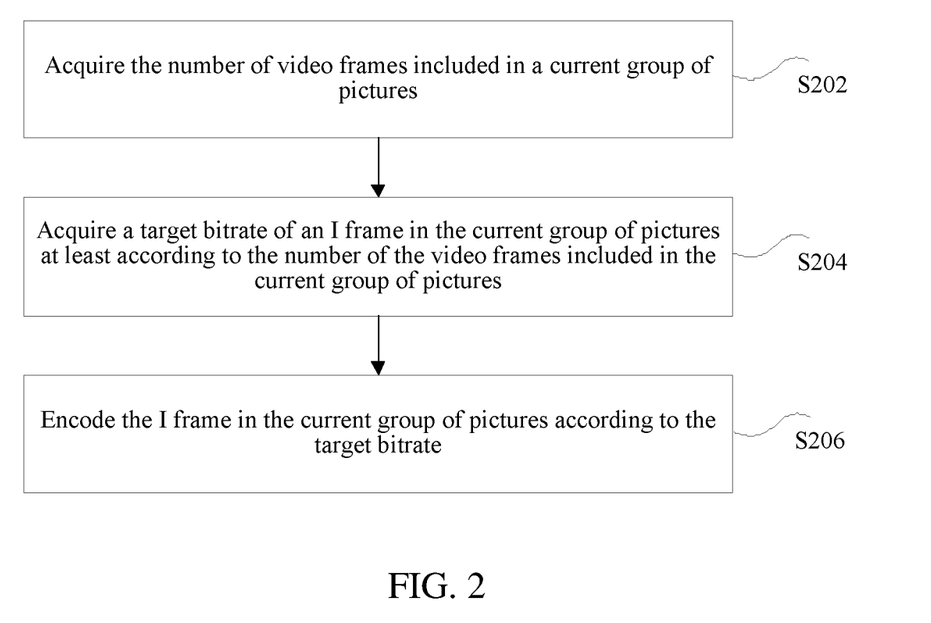
FIG. 2 is a flowchart of a method for processing a video bitrate according to an embodiment of this application.

FIG. 2 is a flowchart of a method for processing a video bitrate according to an embodiment of this application. As shown in FIG. 2, the method may include the following steps:

Step S202: Acquire the number of video frames included in a current group of pictures, a starting frame of the current group of pictures being an I frame (i.e., a current I-frame);

Step S204: Acquire a target bitrate of the I frame in the current group of pictures according to the number of the video frames included in the current group of pictures; and Step S206: Encode the I frame in the current group of pictures according to the target bitrate.

By using the foregoing step S202 to step S206, by using the method of acquiring the number of video frames included in a current group of pictures that begins with an I frame, acquiring a target bitrate of the I frame in the current group of pictures according to the number of the video frames included in the current group of pictures, and then encoding the I frame in the current group of pictures according to the target bitrate, because acquiring a target bitrate of the I frame in the current group of pictures according to the number of the video frames included in the current group of pictures can resolve a technical problem that inaccurate allocation of a video bitrate results in a low video effect in related technologies, achieves an objective of determining a target bitrate of the I frame in the group of pictures according to the number of video frames in each set, thereby improving the video compression and play quality.

In the technical solution provided in step S202, during video calling, the number of video frames included in a current group of pictures (GOP) is acquired, a video includes a plurality of video frame groups, each group of pictures includes a plurality of frames, and a starting frame of each group of pictures is an I frame. For example, a group of pictures may include 10 frames, or may include 15 frames, numbers of video frames included in the plurality of video frames may be the same, or may be different, and the number of the video frames included in each group of pictures is preset. Therefore, the number of video frames included in a current group of pictures may be acquired. When numbers of video frames included in the plurality of video frames are different, because the method for processing a video bitrate in this embodiment can determine a target bitrate of the I frame in each group of pictures according to the number of the group of pictures, the I frame in each group of pictures can be better encoded by using the method than using the related technologies, thereby improving the video compression and play quality.

In the technical solution provided in step S204, after acquiring the number of video frames included in a current group of pictures, acquiring a target bitrate of the I frame in the current group of pictures according to the number of the video frames included in the current group of pictures may be calculating the target bitrate according to the number of video frames included in a current group of pictures and a preset formula, or may be searching a table for a target bitrate of a preset I frame corresponding to the number of the video frames. The target bitrate of the I frame is used for encoding the I frame.

In the technical solution provided in step S206, after acquiring a target bitrate of the I frame in the current group of pictures, the I frame in the current group of pictures is encoded according to the target bitrate. After the I frame is encoded, a non-I frame (i.e., a current non-I frame) in the current group of pictures is encoded according to the target bitrate of the I frame. The non-I frame may be a P frame. The I frame in the current group of pictures is encoded according to the target bitrate, a bitrate of the I frame in the current group of pictures after encoded may be the target bitrate, or is close to the target bitrate.

As an optional embodiment, acquiring a target bitrate of the I frame in the current group of pictures according to the number of the video frames included in the current group of pictures may be: calculating a target value of a quantization parameter difference (i.e., a first quantization parameter difference) of the current group of pictures according to the number of the video frames included in the current group of pictures, the quantization parameter difference of the current group of pictures being a difference between a quantization parameter (i.e., a first quantization parameter) of the I frame in the current group of pictures and a quantization parameter (i.e., a second quantization parameter) of a non-I frame; calculating a value (i.e., a correction value) of a correction parameter of the current group of pictures according to the target value of the quantization parameter difference of the current group of pictures and a quantization parameter difference (i.e., a second quantization parameter difference) of a previous group of pictures of the current group of pictures, the correction parameter being used for correcting the target bitrate of the I frame in the current group of pictures, and the quantization parameter difference of the previous group of pictures being a difference between an average value (i.e., a first average value) of actual quantization parameters (i.e., first actual quantization parameters) of a non-I frame (i.e., a previous non-I frame) in the previous group of pictures and an average value (i.e., a second average value) of actual quantization parameters (i.e., second actual quantization parameters) of an I frame (i.e., a previous I frame) in the previous group of pictures; acquiring the target bitrate of the I frame in the current group of pictures according to the value of the correction parameter.

The target value of the quantization parameter difference may be used as an intermediate parameter, and is used for calculating the value of the correction parameter of the current GOP, to obtain the target bitrate of the I frame in the current GOP. After the previous GOP of the current GOP is encoded, actual bitrates of a I frame and a non-I frame in each video frame included in the previous GOP can be acquired. Therefore, the quantization parameter difference of the previous GOP can be obtained. A calculation formula of the quantization parameter difference is defined as: $\delta QP = QP_{ave,not\,I} - QP_{ave,I}$, where $\delta QP$ represents the quantization parameter difference, $QP_{ave,not\,I}$ represents an average value of quantization parameters of the non-I frame, and $QP_{ave,I}$ represents an average value of quantization parameters of the I frame. The average value of quantization parameters of the I frame may be an average value of quantization parameters of a plurality of areas of an I frame image of the GOP. The value of the correction parameter of the current GOP is calculated according to the target value of the quantization parameter difference of the current GOP and the quantization parameter difference of the previous GOP. The quantization parameter of the non-I frame may be a quantization parameter of the quantization parameter of the non-I frame. The quantization parameter difference of the current group of pictures is the difference between the quantization parameter of the I frame and the quantization parameter of the non-I frame. The average value of the quantization parameters of the I frame or the non-I frame of the previous GOP herein is an average value of actual values. Because an actual bitrate of the I frame or the non-I frame of the previous GOP has been determined, the average value of the actual values may be acquired.

As an optional embodiment, the calculating a target value of a quantization parameter difference of the current group of pictures at least according to the number of the video frames included in the current group of pictures includes: comparing the number of the video frames included in the current group of pictures with a first preset threshold and a second preset threshold, the first preset threshold being greater than the second preset threshold; determining the target value of the quantization parameter difference as a first preset quantization parameter value, if the number of the video frames included in the current group of pictures is less than or equal to the second preset threshold; calculating the target value of the quantization parameter difference of the current group of pictures according to a first function, if the number of the video frames included in the current group of pictures is greater than the second preset threshold and less than or equal to the first preset threshold, the number of the video frames included in the current group of pictures being an input parameter of the first function, the target value of the quantization parameter difference of the current group of pictures being an output parameter of the first function, and in the first function, a larger number of the video frames included in the current group of pictures indicating a larger target value of the quantization parameter difference of the current group of pictures; and calculating the target value of the quantization parameter difference of the current group of pictures according to a second function, if the number of the video frames included in the current group of pictures is greater than the first preset threshold, the number of the video frames included in the current group of pictures being an input parameter of the second function, the target value of the quantization parameter difference of the current group of pictures being an output parameter of the second function, and in the second function, a larger number of the video frames included in the current group of pictures indicating a smaller target value of the quantization parameter difference of the current group of pictures.

The target value of the quantization parameter difference of the current GOP is calculated according to the number of the video frames included in the current GOP. The target value of the quantization parameter difference is piecewise calculated according to the number of the video frames included in the GOP. The first preset threshold and the second preset threshold are preset number thresholds. The first preset threshold and the second preset threshold may be changed according to an actual requirement. When the number of the video frames in the GOP is less than or equal to the second preset threshold, the target value of the quantization parameter difference is the first preset quantization parameter value. When the number of the video frames in the GOP is between the first preset threshold and the second preset threshold, the target value of the quantization parameter difference is calculated according to the first function, and the first function is an increasing function of the number of the video frames in the GOP. When the number of the video frames in the GOP is greater than the first preset threshold, the target value of the quantization parameter difference is calculated according to the second function, and the second function is a decreasing function of the number of the video frames in the GOP. The number of the video frames in the GOP is less than the first preset threshold or greater than the first preset threshold, and the target value of the quantization parameter difference may be continuous or may be discontinuous. That the target value of the quantization parameter difference is piecewise calculated according to the number of the video frames included in the GOP can improve flexibility of the target value of the quantization parameter difference of the GOP, and can adapt to GOPs of video frames of different numbers, to make a result of processing a video bitrate more accurate, thereby improving the quality of video calling.

As an optional embodiment, the calculating a value of a correction parameter of the current group of pictures according to the target value of the quantization parameter difference of the current group of pictures and a quantization parameter difference of a previous group of pictures of the current group of pictures includes: calculating a difference $\delta QP_{preGOP} - \delta QP_{Target}$ between a value (i.e., an actual value) of an actual quantization parameter $\delta QP_{preGOP}$ of the previous group of pictures of the current group of pictures and a value of the target value $\delta QP_{Target}$ of the quantization parameter difference of the current group of pictures; and calculating the value of the correction parameter $h(\delta QP_{preGOP} - \delta QP_{Target})$ of the current group of pictures according to the difference by using the following formula:

corrected by using the value of the correction parameter, to obtain a more accurate target bitrate.

As an optional embodiment, the acquiring the target bitrate of the I frame in the current group of pictures according to the value of the correction parameter includes: calculating the target bitrate of the I frame in the current group of pictures by using the following formula:

$$Isize_{Target} = \frac{Bit_{I,pre}}{Bit_{ave,notI,preGOP}} \cdot h(\delta QP_{preGOP} - \delta QP_{Target}),$$

$h(\delta QP_{preGOP} - \delta QP_{Target})$ representing the correction parameter of the current group of pictures, $Isize_{Target}$ representing the target bitrate of the I frame in the current group of pictures, $Bit_{I,pre}$ representing an actual bitrate of the I frame in the previous group of pictures of the current group of pictures, and $Bit_{ave,notI,preGOP}$ representing an average value of actual bitrates of the non-I frame in the previous group of pictures of the current group of pictures.

After the value of the correction parameter is calculated, the target bitrate of the I frame in the current group of pictures is calculated according to the value of the correction parameter. The target bitrate is corrected by using the correction parameter, improving accuracy of a calculation result of the target bitrate, improving accuracy of processing a video bitrate, further improving the quality of real-time video calling, having great significance to the quality stationarity and the bitrate stationarity during video calling, and capable of effectively resolve problems in a plurality of aspects, for example, a delay, beyond network carrying capability, and the low compression efficiency.

This application further provides an embodiment, and a calculation solution in this application is described below by using a complete embodiment.

A quantization parameter (QP) of an I frame may be less than or equal to a quantization parameter of a non-I frame, and it is defined that $\delta QP = QP_{ave,notI} - QP_{ave,I}$. A quantization parameter is calculated by using a difference. Therefore, $\delta VP$ is also referred to as a quantization parameter differ- $$h(\delta QP_{preGOP} - \delta QP_{Target}) = \begin{cases} 1 + \lambda \Box \delta QP_{max1} & \delta QP_{preGOP} - \delta QP_{Target} < -\delta QP_{max1} \\ 1 - \lambda \Box \delta QP_{max2} & \delta QP_{preGOP} - \delta QP_{Target} > \delta QP_{max2} \\ 1 - \lambda \Box (\delta QP_{preGOP} - \delta QP_{Target}), & \delta QP_{max1} \le \delta QP_{preGOP} - \delta QP_{Target} \le \delta QP_{max2} \end{cases},$$

$\delta QP_{max1}$ representing a first preset value, $\delta QP_{max2}$ representing a second preset value, and $\lambda$ representing a third preset value.

The function of the correction parameter $h(\delta QP_{preGOP} - \delta QP_{Target})$ is to correct the target bitrate of the I frame in the GOP. The correction parameter is also calculated by using a piecewise function. By using the difference $\delta QP_{preGOP} - \delta QP_{Target}$ between the value of the actual quantization parameter $\delta QP_{preGOP}$ of the previous GOP of the current GOP and the value of the target value $\delta QP_{Target}$ of the quantization parameter difference of the current GOP as piecewise interval reference, the value of the correction parameter is calculated by using different calculation formulas in different intervals, and then the target bitrate is corrected by using the value of the correction parameter. The correction parameter is piecewise calculated. Therefore, the value of the correction parameter can be more accurately obtained. Then the target bitrate in the current GOP is ence. $QP_{ave,notI}$ represents an average value of quantization parameters of the non-I frame, that is, an average value of actual values of the quantization parameters of the non-I frame. $QP_{ave,I}$ represents an average value of quantization parameters of the I frame, that is, an average value of actual values of the quantization parameters of the I frame. For a same sequence, a larger $\delta QP$ indicates a larger bitrate of the I frame/the non-I frame. A $\delta QP$ target is defined as $\delta QP_{Target}$, that is a target value of the quantization parameter difference.

When the number of video frames in a GOP is less than a first preset threshold $Thre_{GOP1}$ and greater than a second preset threshold $Thre_{GOP2}$, a larger I frame space (because only a first frame of each GOP is the I frame, a larger number of the video frames in the GOP indicates a larger I frame space) indicates a larger improvement of the bitrate of the I frame to entire compression performance. Therefore, when the number of the video frames in the GOP is less than Thre$_{GOP1}$ and greater than Thre$_{GOP2}$, the larger I frame space indicates a higher allocated I frame bitrate. When the number of the video frames in the GOP is greater than the threshold Thre$_{GOP1}$, the number of non-I frames affected by the I frame is limited. Therefore, when the number of the video frames in the GOP is larger, the I frame bitrate may be lowered instead. In addition, when the number of the video frames in the GOP is less than the threshold Thre$_{GOP2}$, improving the I frame bitrate easily causes that an actual bitrate is beyond a target bitrate when a scenario changes. Therefore, the I frame bitrate may be further lowered, Thre$_{GOP2}$<Thre$_{GOP1}$.

The target value $\delta QP_{Target}$ of the quantization parameter difference is calculated by using a piecewise function:

$$\delta QP_{Target} = \begin{cases} \delta_{QP1} & GOP \leq Thre_{GOP2} \\ f(GOP), & Thre_{GOP2} < GOP \leq Thre_{GOP1} \\ g(GOP) & GOP > Thre_{GOP1} \end{cases}.$$

GOP represents the number of the video frames in the GOP, f(GOP) is an increasing function of GOP, and g(GOP) is a decreasing function of GOP. Optionally, the first preset threshold may be 64, and the second preset threshold may be 32.

A target bitrate Isize$_{Target}$ of the I frame may be calculated by using the following formula:

$$Isize_{Target} = \frac{Bit_{I,pre}}{Bit_{ave,P,preGOP}} \cdot h(\delta QP_{preGOP} - \delta QP_{Target}).$$

The function of a $h(\delta QP_{preGOP} - \delta QP_{Target})$ function is to correct the target bitrate of the I frame according to an actual quantization parameter $\delta QP_{preGOP}$ of a previous GOP and the target value $\delta QP_{Target}$ of the quantization parameter difference. An implementation of the $h(\delta QP_{preGOP} - \delta QP_{Target})$ function is as follows:

$$h(\delta QP_{preGOP} - \delta QP_{Target}) = \begin{cases} 1 + \lambda \square \delta QP_{max1} & \delta QP_{preGOP} - \delta QP_{Target} < -\delta QP_{max1} \\ 1 - \lambda \square \delta QP_{max2} & \delta QP_{preGOP} - \delta QP_{Target} > \delta QP_{max2} \\ 1 - \lambda \square (\delta QP_{preGOP} - \delta QP_{Target}), & \delta QP_{max1} \leq \delta QP_{preGOP} - \delta QP_{Target} \leq \delta QP_{max2} \end{cases}.$$

$\delta QP_{max1}$ and $\delta QP_{max2}$ are parameters set to prevent the target bitrate from being excessively quickly adjusted, values of $\delta QP_{max1}$ and $\delta QP_{max2}$ may be parameters ranging from 3 to 6, a value of $\lambda$ may be a number less than 0.08, for example, 0.05.

A bitrate allocation strategy of the I frame is a factor for the bitrate stationarity and the video compression efficiency. After the target bitrate of the I frame is calculated, an I frame in each GOP is encoded according to the target bitrate, and then a non-I frame in the GOP is encoded. The non-I frame may be a P frame. In such an encoding manner, technical problems such as subjective flicker and incoherence of a screen during video calling, a delay and packet loss in related technologies can be effectively resolved, and the screen quality during video calling and the stability of file transfer are improved.

A method for processing a video bitrate in this embodiment may be used as a bitrate allocation method of an I frame when a bitrate control is jointly performed on an I frame and a PSB frame in real-time video communications, can effectively resolve a technical problem that inaccurate allocation of a video bitrate results in a low video effect in related technologies, and improves an effect of video calling, so that a screen is smooth, freezes are reduced, and user experience is improved.

To simplify the description, the foregoing method embodiments are described as a series of action combination. But a person of ordinary skill in the art may know that this application is not limited to any described sequence of the action, as some steps can adopt other sequences or can be performed simultaneously according to this application. Secondarily, a person skilled in the art may know that the embodiments described in the specification all belong to embodiments and the involved actions and modules are not necessary for this application.

Through the foregoing description of the implementations, it is clear to a person skilled in the art that this application may be implemented by software plus an universal hardware platform according to methods of the foregoing embodiments, and may also be implemented by hardware, but in many cases, the software implementation is preferred. Based on such an understanding, the technical solutions of this application or the part that makes contributions to the related technologies may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to perform the method according to the embodiments of this application.

According to another embodiment of this application, an apparatus for processing a video bitrate configured to implement the foregoing method for processing a video bitrate is further provided.

Figure 3:
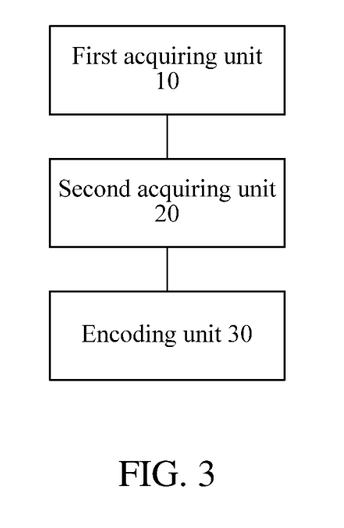
FIG. 3 is a schematic diagram of an apparatus for processing a video bitrate according to an embodiment of this application.

FIG. 3 is a schematic diagram of an apparatus for processing a video bitrate according to an embodiment of this application. As shown in FIG. 3, the apparatus may include:

a first acquiring unit 10, configured to acquire the number of video frames included in a current group of pictures, a starting frame of the current group of pictures being an I frame;

a second acquiring unit 20, configured to acquire a target bitrate of the I frame in the current group of pictures according to the number of the video frames included in the current group of pictures; and an encoding unit 30, configured to encode the I frame in the current group of pictures according to the target bitrate.

The first acquiring unit 10 in this embodiment may be configured to perform step S202 in Embodiment 1 of this application, the second acquiring unit 20 in this embodiment may be configured to perform step S204 in Embodiment 1 of this application, and the encoding unit 30 in this embodiment may be configured to perform step S206 in Embodiment 1 of this application.

The foregoing modules are the same as examples and application scenarios implemented by corresponding steps, but are not limited to the content disclosed by the foregoing Embodiment 1. The foregoing modules, as a part of the apparatus, can run in the hardware environment as shown in FIG. 1, may be implemented by software, or may be implemented by hardware.

The foregoing modules can resolve a technical problem that inaccurate allocation of a video bitrate results in a low video effect in related technologies, and further achieve a technical effect of improving the video compression and play quality.

Optionally, the second acquiring unit 20 includes: a first calculation module, configured to calculate a target value of a quantization parameter difference of the current group of pictures according to the number of the video frames included in the current group of pictures, the quantization parameter difference of the current group of pictures being a difference between a quantization parameter of the I frame in the current group of pictures and a quantization parameter of a non-I frame; a second calculation module, configured to calculate a value of a correction parameter of the current group of pictures according to the target value of the quantization parameter difference of the current group of pictures and a quantization parameter difference of a previous group of pictures of the current group of pictures, the correction parameter being used for correcting the target bitrate of the I frame in the current group of pictures, and the quantization parameter difference of the previous group of pictures being a difference between an average value of actual quantization parameters of a non-I frame in the previous group of pictures and an average value of actual quantization parameters of an I frame in the previous group of pictures; and an acquiring module, configured to acquire the target bitrate of the I frame in the current group of pictures according to the value of the correction parameter.

Optionally, the first calculation module includes: a judgment submodule, configured to compare the number of the video frames included in the current group of pictures with a first preset threshold and a second preset threshold, the first preset threshold being greater than the second preset threshold; a determining submodule, configured to determine the target value of the quantization parameter difference as a first preset quantization parameter value, when the number of the video frames included in the current group of pictures is less than or equal to the second preset threshold; calculating the target value of the quantization parameter difference of the current group of pictures according to a first function, when the number of the video frames included in the current group of pictures is greater than the second preset threshold and less than or equal to the first preset threshold, the number of the video frames included in the current group of pictures being an input parameter of the first function, the target value of the quantization parameter difference of the current group of pictures being an output parameter of the first function, and in the first function, a larger number of the video frames included in the current group of pictures indicating a larger target value of the quantization parameter difference of the current group of pictures; and calculating the target value of the quantization parameter difference of the current group of pictures according to a second function, when the number of the video frames included in the current group of pictures is greater than the first preset threshold, the number of the video frames included in the current group of pictures being an input parameter of the second function, the target value of the quantization parameter difference of the current group of pictures being an output parameter of the second function, and in the second function, a larger number of the video frames included in the current group of pictures indicating a smaller target value of the quantization parameter difference of the current group of pictures.

Optionally, the second calculation module includes: a first calculation submodule, configured to calculate a difference $\delta QP_{preGOP} - \delta QP_{Target}$ between a value of an actual quantization parameter $\delta QP_{preGOP}$ of the previous group of pictures of the current group of pictures and a value of the target value $\delta QP_{Target}$ of the quantization parameter difference of the current group of pictures; and a second calculation submodule, configured to calculate the value of the correction parameter $h(\delta QP_{preGOP} - \delta QP_{Target})$ of the current group of pictures according to the difference by using the following formula:

$$h(\delta QP_{preGOP} - \delta QP_{Target}) = \begin{cases} 1 + \lambda \square \delta QP_{max1} & \delta QP_{preGOP} - \delta QP_{Target} < -\delta QP_{max1} \\ 1 - \lambda \square \delta QP_{max2} & \delta QP_{preGOP} - \delta QP_{Target} > \delta QP_{max2} \\ 1 - \lambda \square (\delta QP_{preGOP} - \delta QP_{Target}), & \delta QP_{max1} \leq \delta QP_{preGOP} - \delta QP_{Target} \leq \delta QP_{max2} \end{cases},$$

$\delta QP_{max1}$ representing a first preset value, $\delta QP_{max2}$ representing a second preset value, and $\lambda$ representing a third preset value.

Optionally, the acquiring module is configured to calculate the target bitrate of the I frame in the current group of pictures by using the following formula:

$$Isize_{Target} = \frac{Bit_{I,pre}}{Bit_{ave,notI,preGOP}} \cdot h(\delta QP_{preGOP} - \delta QP_{Target}).$$

$h(\delta QP_{preGOP} - \delta QP_{Target})$ represents the correction parameter of the current group of pictures, $Bit_{I,pre}$ represents the target bitrate of the I frame in the current group of pictures, $Bit_{I,pre}$ represents an actual bitrate of the I frame in the previous group of pictures of the current group of pictures, and $Bit_{ave,not I,preGOP}$ represents an average value of actual bitrates of the non-I frame in the previous group of pictures of the current group of pictures.

The foregoing modules are the same as examples and application scenarios implemented by corresponding steps, but are not limited to the content disclosed by the foregoing Embodiment 1. The foregoing modules, as a part of the apparatus, can run in the hardware environment as shown in FIG. 1, may be implemented by software, or may be implemented by hardware. The hardware environment includes a network environment.

According to another embodiment of this application, an electronic device configured to implement the foregoing method for processing a video bitrate is further provided.

Figure 4:
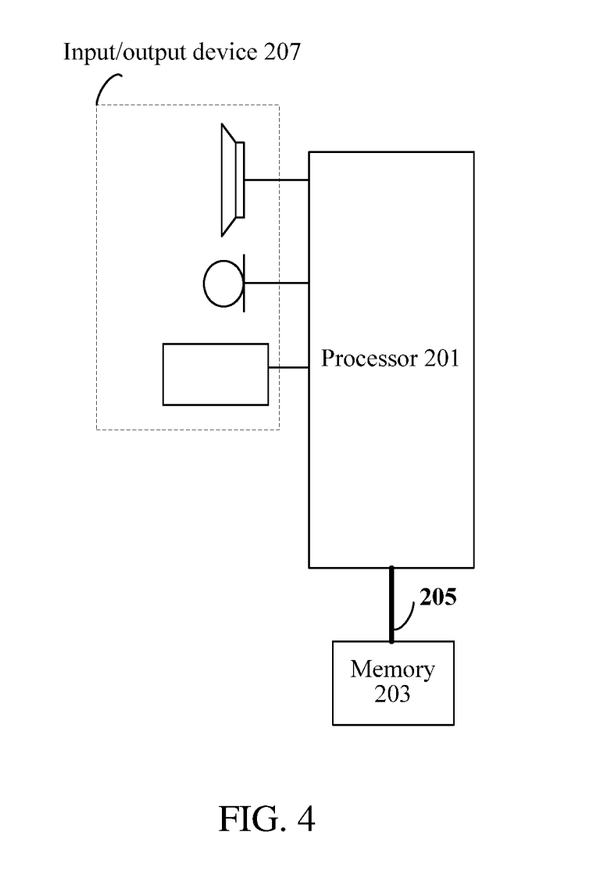
FIG. 4 is a structural block diagram of a terminal according to an embodiment of this application.

FIG. 4 is a structural block diagram of an electronic device according to an embodiment of this application. As shown in FIG. 4, the electronic device may include: one or more (only one is shown in the figure) processors 201, a memory 203, and a transmission apparatus 205 (for example, a sending apparatus in the foregoing embodiments). As shown in FIG. 4, the electronic device may further include an input/output device 207.

The memory 203 may be configured to store a software program and a module, for example, a program instruction/module corresponding to the method and the apparatus for processing a video bitrate in this embodiment of this application, and the processor 201 performs various functional applications and data processing by running the software program and the module stored in the memory 203, that is, implementing the foregoing method for processing a video bitrate. The memory 203 may include a high-speed random memory, and may also include a nonvolatile memory, for example, one or more magnetic storage devices, flash memories or other nonvolatile solid-state memories. In some instances, the memory 203 may further include memories remotely disposed relative to the processor 201, and these remote memories may be connected to the electronic device through a network. Instances of the network include, but are not limited to, the Internet, an intranet, a local area network, a mobile communications network, and a combination thereof.

The foregoing transmission apparatus 205 is configured to receive or send data through a network, and may also be configured to perform data transmission between the processor and the memory. instances of the foregoing network may include a wired network and a wireless network. in an instance, the transmission apparatus 205 includes a network interface controller (NIC) that may be connected to another network device and a router by using a network cable, thereby communicating with the Internet or the local area network. in an instance, the transmission apparatus 205 is a radio frequency (RF) module that is configured to communicate with the Internet in a wireless manner.

The memory 203 is configured to store an executable instruction.

The processor 201 may invoke, by using the transmission apparatus 205, the executable instruction stored in the memory 203, to perform the following steps: acquiring the number of video frames included in a current group of pictures, a starting frame of the current group of pictures being an I frame; acquiring a target bitrate of the I frame in the current group of pictures according to the number of the video frames included in the current group of pictures, the target bitrate of the I frame being used for encoding the I frame; and encoding the I frame in the current group of pictures according to the target bitrate.

The processor 201 may also invoke, by using the transmission apparatus 205, the executable instruction stored in the memory 203, to perform the following steps: the acquiring a target bitrate of the I frame in the current group of pictures according to the number of the video frames included in the current group of pictures including: calculating a target value of a quantization parameter difference of the current group of pictures according to the number of the video frames included in the current group of pictures, the quantization parameter difference of the current group of pictures being a difference between a quantization parameter of the I frame in the current group of pictures and a quantization parameter of a non-I frame; calculating a value of a correction parameter of the current group of pictures according to the target value of the quantization parameter difference of the current group of pictures and a quantization parameter difference of a previous group of pictures of the current group of pictures, the correction parameter being used for correcting the target bitrate of the I frame in the current group of pictures, and the quantization parameter difference of the previous group of pictures being a difference between an average value of actual quantization parameters of a non-I frame in the previous group of pictures and an average value of actual quantization parameters of an I frame in the previous group of pictures; and acquiring the target bitrate of the I frame in the current group of pictures according to the value of the correction parameter.

The processor 201 may also invoke, by using the transmission apparatus 205, the executable instruction stored in the memory 203, to perform the following steps: the calculating a target value of a quantization parameter difference of the current group of pictures according to the number of the video frames included in the current group of pictures including: comparing the number of the video frames included in the current group of pictures with a first preset threshold and a second preset threshold, the first preset threshold being greater than the second preset threshold; determining the target value of the quantization parameter difference as a first preset quantization parameter value, if the number of the video frames included in the current group of pictures is less than or equal to the second preset threshold; calculating the target value of the quantization parameter difference of the current group of pictures according to a first function, if the number of the video frames included in the current group of pictures is greater than the second preset threshold and less than or equal to the first preset threshold, the number of the video frames included in the current group of pictures being an input parameter of the first function, the target value of the quantization parameter difference of the current group of pictures being an output parameter of the first function, and in the first function, a larger number of the video frames included in the current group of pictures indicating a larger target value of the quantization parameter difference of the current group of pictures; and calculating the target value of the quantization parameter difference of the current group of pictures according to a second function, if the number of the video frames included in the current group of pictures is greater than the first preset threshold, the number of the video frames included in the current group of pictures being an input parameter of the second function, the target value of the quantization parameter difference of the current group of pictures being an output parameter of the second function, and in the second function, a larger number of the video frames included in the current group of pictures indicating a smaller target value of the quantization parameter difference of the current group of pictures.

The processor 201 may also invoke, by using the transmission apparatus 205, the executable instruction stored in the memory 203, to perform the following steps: the calculating a value of a correction parameter of the current group of pictures according to the target value of the quantization parameter difference of the current group of pictures and a quantization parameter difference of a previous group of pictures of the current group of pictures includes: calculating a difference $\delta QP_{preGOP} - \delta QP_{Target}$ between a value of an actual quantization parameter $\delta QP_{preGOP}$ of the previous group of pictures of the current group of pictures and a value of the target value $\delta QP_{Target}$ of the quantization parameter difference of the current group of pictures; and calculating the value of the correction parameter $h(\delta QP_{preGOP} - \delta QP_{Target})$ of the current group of pictures according to the difference by using the following formula:

$$h(\delta QP_{preGOP} - \delta QP_{Target}) = \begin{cases} 1 + \lambda \Box \delta QP_{max1} & \delta QP_{preGOP} - \delta QP_{Target} < -\delta QP_{max1} \\ 1 - \lambda \Box \delta QP_{max2} & \delta QP_{preGOP} - \delta QP_{Target} > \delta QP_{max2} \\ 1 - \lambda \Box (\delta QP_{preGOP} - \delta QP_{Target}), & \delta QP_{max1} \leq \delta QP_{preGOP} - \delta QP_{Target} \leq \delta QP_{max2} \end{cases},$$

$\delta QP_{max1}$ representing a first preset value, $\delta QP_{max2}$ representing a second preset value, and $\lambda$ representing a third preset value.

The processor 201 may also invoke, by using the transmission apparatus 205, the executable instruction stored in the memory 203, to perform the following steps: the acquiring the target bitrate of the I frame in the current group of pictures according to the value of the correction parameter including: calculating the target bitrate of the I frame in the current group of pictures by using the following formula:

$$Isize_{Target} = \frac{Bit_{I,pre}}{Bit_{ave,notI,preGOP}} \cdot h(\delta QP_{preGOP} - \delta QP_{Target}),$$

$h(\delta QP_{preGOP} - \delta QP_{Target})$ representing the correction parameter of the current group of pictures, $I_{sizeTarget}$ representing the target bitrate of the I frame in the current group of pictures, $Bit_{I,pre}$ representing an actual bitrate of the I frame in the previous group of pictures of the current group of pictures, and $Bit_{ave,not\ I,preGOP}$ representing an average value of actual bitrates of the non-I frame in the previous group of pictures of the current group of pictures.

In this embodiment of this application, by using the method of acquiring the number of video frames included in a current group of pictures that begins with an I frame, acquiring a target bitrate of the I frame in the current group of pictures according to the number of the video frames included in the current group of pictures, and then encoding the I frame in the current group of pictures according to the target bitrate, because acquiring a target bitrate of the I frame in the current group of pictures according to the number of the video frames included in the current group of pictures achieves an objective of determining a target bitrate of the I frame in the group of pictures according to the number of video frames in each set, thereby achieving an technical effect of improving the video compression and play quality, and further resolving a technical problem that inaccurate allocation of a video bitrate results in a low video effect in related technologies.

Optionally, for an example in this embodiment, refer to the examples described in Embodiment 1 and Embodiment 2, and details are not described herein again in this embodiment.

A person of ordinary skill in the art may understand that, the structure shown in FIG. 4 is only schematic. Alternatively, the electronic device may be an electronic device such as a smartphone (for example, an Android mobile phone or an iOS mobile phone), a tablet computer, a palmtop computer, a mobile Internet device (MID), or a PAD. FIG. 4 does not limit the structure of the foregoing electronic device. For example, the electronic device may further include more or less components (for example, a network interface and a display apparatus) than those shown in FIG. 4, or has a configuration different from that shown in FIG. 4.

A person of ordinary skill in the art may understand that all or some of the procedures of the methods of the foregoing embodiments may be implemented by a program instructing relevant hardware of the electronic device. The program may be stored in a non-transitory computer-readable storage medium.

Another embodiment of this application further provides a storage medium. Optionally, in this embodiment, the foregoing storage medium may be configured to execute program code of the method for processing a video bitrate.

Optionally, in this embodiment, the foregoing storage medium may be located on at least one network device of a plurality of network devices of the network shown in the foregoing embodiments.

Optionally, in this embodiment, the storage medium is configured to store program code used for performing the following steps:

S1: acquiring the number of video frames included in a current group of pictures, a starting frame of the current group of pictures being an I frame;

S2: acquiring a target bitrate of the I frame in the current group of pictures according to the number of the video frames included in the current group of pictures, the target bitrate of the I frame being used for encoding the I frame; and S3: encoding the I frame in the current group of pictures according to the target Optionally, the storage medium is also configured to store program code used for performing the following steps: the acquiring a target bitrate of the I frame in the current group of pictures according to the number of the video frames included in the current group of pictures including: calculating a target value of a quantization parameter difference of the current group of pictures according to the number of the video frames included in the current group of pictures, the quantization parameter difference of the current group of pictures being a difference between a quantization parameter of the I frame in the current group of pictures and a quantization parameter of a non-I frame; calculating a value of a correction parameter of the current group of pictures according to the target value of the quantization parameter difference of the current group of pictures and a quantization parameter difference of a previous group of pictures of the current group of pictures, the correction parameter being used for correcting the target bitrate of the I frame in the current group of pictures, and the quantization parameter difference of the previous group of pictures being a difference between an average value of actual quantization parameters of a non-I frame in the previous group of pictures and an average value of actual quantization parameters of an I frame in the previous group of pictures; and acquiring the target bitrate of the I frame in the current group of pictures according to the value of the correction parameter.

Optionally, the storage medium is also configured to store program code used for performing the following steps: the calculating a target value of a quantization parameter difference of the current group of pictures according to the number of the video frames included in the current group of pictures including: comparing the number of the video frames included in the current group of pictures with a first preset threshold and a second preset threshold, the first preset threshold being greater than the second preset threshold; determining the target value of the quantization parameter difference as a first preset quantization parameter value, if the number of the video frames included in the current group of pictures is less than or equal to the second preset threshold; calculating the target value of the quantization parameter difference of the current group of pictures according to a first function, if the number of the video frames included in the current group of pictures is greater than the second preset threshold and less than or equal to the first preset threshold, the number of the video frames included in the current group of pictures being an input parameter of the first function, the target value of the quantization parameter difference of the current group of pictures being an output parameter of the first function, and in the first function, a larger number of the video frames included in the current group of pictures indicating a larger target value of the quantization parameter difference of the current group of pictures; and calculating the target value of the quantization parameter difference of the current group of pictures according to a second function, if the number of the video frames included in the current group of pictures is greater than the first preset threshold, the number of the video frames included in the current group of pictures being an input parameter of the second function, the target value of the quantization parameter difference of the current group of pictures being an output parameter of the second function, and in the second function, a larger number of the video frames included in the current group of pictures indicating a smaller target value of the quantization parameter difference of the current group of pictures.

Optionally, the storage medium is also configured to store program code used for performing the following steps: the calculating a value of a correction parameter of the current group of pictures according to the target value of the quantization parameter difference of the current group of pictures and a quantization parameter difference of a previous group of pictures of the current group of pictures includes: calculating a difference $\delta QP_{preGOP} - \delta QP_{Target}$ between a value of an actual quantization parameter $\delta QP_{preGOP}$ of the previous group of pictures of the current group of pictures and a value of the target value $\delta QP_{Target}$ of the quantization parameter difference of the current group of pictures; and calculating the value of the correction parameter $h(\delta QP_{preGOP} - \delta QP_{Target})$ of the current group of pictures according to the difference by using the following formula:

$$h(\delta QP_{preGOP} - \delta QP_{Target}) = \begin{cases} 1 + \lambda \Box \delta QP_{max1} & \delta QP_{preGOP} - \delta QP_{Target} < -\delta QP_{max1} \\ 1 - \lambda \Box \delta QP_{max2} & \delta QP_{preGOP} - \delta QP_{Target} > \delta QP_{max2} \\ 1 - \lambda \Box (\delta QP_{preGOP} - \delta QP_{Target}), & \delta QP_{max1} \le \delta QP_{preGOP} - \delta QP_{Target} \le \delta QP_{max2} \end{cases},$$

$\delta QP_{max1}$ representing a first preset value, $\delta QP_{max2}$ representing a second preset value, and $\lambda$ representing a third preset value.

Optionally, the storage medium is also configured to store program code used for performing the following steps: the acquiring the target bitrate of the I frame in the current group of pictures according to the value of the correction parameter including: calculating the target bitrate of the I frame in the current group of pictures by using the following formula:

$$Isize_{Target} = \frac{Bit_{I,pre}}{Bit_{ave,notI,preGOP}} \cdot h(\delta QP_{preGOP} - \delta QP_{Target}) h(\delta QP_{preGOP} - \delta QP_{Target})$$

representing the correction parameter of the current group of pictures, $Isize_{Target}$ representing the target bitrate of the I frame in the current group of pictures, $Bit_{I,pre}$ representing an actual bitrate of the I frame in the previous group of pictures of the current group of pictures, and $Bit_{ave,not\ I,\ preGOP}$ representing an average value of actual bitrates of the non-I frame in the previous group of pictures of the current group of pictures.

Optionally, each implementation of this application have different emphases on the discussion of the technical solutions, for the content not mentioned in an implementation, reference may be made to examples described in other implementations, and this implementation does not describe details herein again.

Optionally, in this embodiment, the foregoing storage medium may include, but is not limited to: various media that can store program code, for example, a USB flash drive, a read-only memory (ROM), a random access memory (RAM), a removable hard disk, a magnetic disk, or an optical disc.

When the integrated unit in the foregoing embodiment is implemented in a form of a software functional module and sold or used as an independent product, the integrated unit may be stored in the foregoing computer-readable storage medium. Based on such an understanding, the technical solutions of this application, or the part contributing to related technologies, or all or some of the technical solutions may be implemented in a form of a software product. The computer software product is stored in a storage medium and includes several instructions for instructing one or more computer devices (which may be a personal computer, a server, or a network device) to perform all or some of the steps of the methods in the embodiments of this application.

In the foregoing embodiments of this application, descriptions of the embodiments have different emphases, and as for parts that are not described in detail in one embodiment, reference can be made to relevant description of other embodiments.

In the several embodiments provided in this application, the disclosed client may be implemented in other manners. The described apparatus embodiment is an example. For example, the unit division is logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, and/or may be implemented in a form of a software functional unit.

The above descriptions are example implementations of this application, and a person of ordinary skill in the art may make various improvements and refinements without departing from the principle of this application. All such modifications and refinements may also be considered as the protection scope of this application.

Industrial Practicability

In the embodiments of this application, by using the method of acquiring the number of video frames included in a current group of pictures begins with an I frame, acquiring a target bitrate of the I frame in the current group of pictures at least according to the number of the video frames included in the current group of pictures, and then encoding the I frame in the current group of pictures according to the target bitrate, because acquiring a target bitrate of the I frame in the current group of pictures according to the number of the video frames included in the current group of pictures achieves an objective of determining a target bitrate of the I frame in the group of pictures according to the number of video frames in each set. This thereby achieves a technical effect of improving the video compression and play quality, and further resolving a technical problem that inaccurate allocation of a video bitrate results in a low video effect in related technologies.

What is claimed is:

1. A method for processing a video bitrate, the method being performed by at least one processor, and the method comprising:

acquiring a number of video frames comprised in a current group of pictures, a starting frame of the current group of pictures being a current I frame;

acquiring a target bitrate of the current I frame, based on the number of the video frames comprised in the current group of pictures, using a following formula:

$$Isize_{Target} = \frac{Bit_{I,pre}}{Bit_{ave,notI,preGOP}} \cdot h(\delta QP_{preGOP} - \delta QP_{Target}),$$

$h(\delta QP_{proGOP} - \delta QP_{Target})$ representing a correction parameter of the current group of pictures, $Isize_{Target}$ representing the target bitrate, $Bit_{I,pre}$ representing an actual bitrate of a previous I frame, and $Bit_{ave,not\ I,preGOP}$ average value of actual bitrates of a previous non-I frame; and encoding the current I frame, based on the target bitrate.

2. The method according to claim 1, wherein the acquiring the target bitrate comprises:

calculating a target value of a first quantization parameter difference of the current group of pictures, based on the number of the video frames comprised in the current group of pictures, the first quantization parameter difference being between a first quantization parameter of the current I frame and a second quantization parameter of a current non-I frame;

calculating a correction value of the correction parameter of the current group of pictures, based on the target value of the first quantization parameter difference and a second quantization parameter difference of a previous group of pictures from the current group of pictures, the second quantization parameter difference being between a first average value of first actual quantization parameters of the previous non-I frame in the previous group of pictures and a second average value of second actual quantization parameters of the previous I frame in the previous group of pictures; and correcting the target bitrate of the current I frame, based on the correction value of the correction parameter.

3. The method according to claim 2, wherein the calculating the target value of the first quantization parameter difference comprises:

comparing the number of the video frames comprised in the current group of pictures with a first preset threshold and a second preset threshold, the first preset threshold being greater than the second preset threshold;

determining the target value of the first quantization parameter difference as a first preset quantization parameter value, based on the number of the video frames comprised in the current group of pictures being less than or equal to the second preset threshold;

calculating the target value of the first quantization parameter difference, based on a first function, based on the number of the video frames comprised in the current group of pictures being greater than the second preset threshold and less than or equal to the first preset threshold, the number of the video frames comprised in the current group of pictures being input in the first function, and in the first function, when the number of the video frames comprised in the current group of pictures is larger, the target value of the first quantization parameter difference is larger; and calculating the target value of the first quantization parameter difference, based on a second function, based on the number of the video frames comprised in the current group of pictures being greater than the first preset threshold, the number of the video frames comprised in the current group of pictures being input in the second function, and in the second function, when the number of the video frames comprised in the current group of pictures is smaller, the target value of the first quantization parameter difference is smaller.

4. The method according to claim 2, wherein the calculating the correction value of the correction parameter comprises:

calculating a difference $\delta QP_{preGOP} - \delta QP_{Target}$ between an actual value of an actual quantization parameter $\delta QP_{preGOP}$ of the previous group of pictures and the target value $\delta QP_{Target}$ of the first quantization parameter difference; and calculating the correction value of the correction parameter $h(\delta QP_{preGOP} - \delta QP_{Target})$, based on the difference $\delta QP_{preGOP} - \delta QP_{Target}$ using a following formula:

$$h(\delta QP_{preGOP} - \delta QP_{Target}) = \begin{cases} 1 + \lambda \square \delta QP_{max1} & \delta QP_{preGOP} - \delta QP_{Target} < -\delta QP_{max1} \\ 1 - \lambda \square \delta QP_{max2} & \delta QP_{preGOP} - \delta QP_{Target} > \delta QP_{max2} \\ 1 - \lambda \square (\delta QP_{preGOP} - \delta QP_{Target}), & \delta QP_{max1} \leq \delta QP_{preGOP} - \delta QP_{Target} \leq \delta QP_{max2} \end{cases},$$

$\delta QP_{max1}$ representing a first preset value, $\delta QP_{max2}$ representing a second preset value, and $\lambda$ representing a third preset value.

5. The method according to claim 1, further comprising controlling to play the current group of pictures, based on the current I frame that is encoded.

6. An apparatus for processing a video bitrate, the apparatus comprising:
at least one memory configured to store computer program code; and
at least one processor configured to access the at least one memory and operate according to the computer program code, the computer program code comprising:
first acquiring code configured to cause the at least one processor to acquire a number of video frames comprised in a current group of pictures, a starting frame of the current group of pictures being a current I frame;
second acquiring code configured to cause the at least one processor to acquire a target bitrate of the current I frame, based on the number of the video frames comprised in the current group of pictures, using a following formula:

$$Isize_{Target} = \frac{Bit_{I,pre}}{Bit_{ave,notI,preGOP}} \cdot h(\delta QP_{preGOP} - \delta QP_{Target}),$$

$h(\delta QP_{preGOP} - \delta QP_{Target})$ representing a correction parameter of the current group of pictures, $Isize_{Target}$ representing the target bitrate, $Bit_{I,pre}$ representing an actual bitrate of a previous I frame, and $Bit_{ave,not\ I,preGOP}$ representing an average value of actual bitrates of a previous non-I frame; and
encoding code configured to cause the at least one processor to encode the current I frame, based on the target bitrate.

7. The apparatus according to claim 6, wherein the second acquiring code is further configured to cause the at least one processor to:
calculate a target value of a first quantization parameter difference of the current group of pictures, based on the number of the video frames comprised in the current group of pictures, the first quantization parameter difference being between a first quantization parameter of the current I frame and a second quantization parameter of a current non-I frame;
calculate a correction value of the correction parameter of the current group of pictures, based on the target value of the first quantization parameter difference and a second quantization parameter difference of a previous group of pictures from the current group of pictures, the second quantization parameter difference being between a first average value of first actual quantization parameters of the previous non-I frame in the previous group of pictures and a second average value of second actual quantization parameters of the previous I frame in the previous group of pictures; and
correct the target bitrate of the current I frame, based on the correction value of the correction parameter.

8. The apparatus according to claim 7, wherein the second acquiring code is further configured to cause the at least one processor to:
compare the number of the video frames comprised in the current group of pictures with a first preset threshold and a second preset threshold, the first preset threshold being greater than the second preset threshold;
determine the target value of the first quantization parameter difference as a first preset quantization parameter value, based on the number of the video frames comprised in the current group of pictures being less than or equal to the second preset threshold;
calculate the target value of the first quantization parameter difference, based on a first function, based on the number of the video frames comprised in the current group of pictures being greater than the second preset threshold and less than or equal to the first preset threshold, the number of the video frames comprised in the current group of pictures being input in the first function, and in the first function, when the number of the video frames comprised in the current group of pictures is larger, the target value of the first quantization parameter difference is larger; and
calculate the target value of the first quantization parameter difference, based on a second function, based on the number of the video frames comprised in the current group of pictures being greater than the first preset threshold, the number of the video frames comprised in the current group of pictures being input in the second function, and in the second function, when the number of the video frames comprised in the current group of pictures is smaller, the target value of the first quantization parameter difference is smaller.

9. The apparatus according to claim 7, wherein the second acquiring code is further configured to cause the at least one processor to:
calculate a difference $\delta QP_{preGOP} - \delta QP_{Target}$ between an actual value of an actual quantization parameter $\delta QP_{preGOP}$ of the previous group of pictures and the target value $\delta QP_{Target}$ of the first quantization parameter difference; and
calculate the correction value of the correction parameter $h(\delta QP_{preGOP} - \delta QP_{Target})$ based on the difference $\delta QP_{preGOP} - \delta QP_{Target}$ using a following formula:

$$h(\delta QP_{preGOP} - \delta QP_{Target}) = \begin{cases} 1 + \lambda \square \delta QP_{max1} & \delta QP_{preGOP} - \delta QP_{Target} < -\delta QP_{max1} \\ 1 - \lambda \square \delta QP_{max2} & \delta QP_{preGOP} - \delta QP_{Target} > \delta QP_{max2} \\ 1 - \lambda \square (\delta QP_{preGOP} - \delta QP_{Target}), & \delta QP_{max1} \leq \delta QP_{preGOP} - \delta QP_{Target} \leq \delta QP_{max2} \end{cases},$$

$\delta QP_{max1}$ representing a first preset value, $\delta QP_{max2}$ representing a second preset value, and $\lambda$ representing a third preset value.

10. The apparatus according to claim 6, wherein the apparatus comprises an electronic device.

11. The apparatus according to claim 6, wherein the at least one processor is further configured to control to play the current group of pictures is played based on the current I frame that is encoded.

12. The apparatus according to claim 6, wherein the apparatus comprises either one or both of a terminal and a server.

13. A non-transitory computer-readable storage medium storing instructions that, when executed, cause at least one processor to:
   acquire a number of video frames comprised in a current group of pictures, a starting frame of the current group of pictures being a current I frame;
   acquire a target bitrate of the current I frame, based on the number of the video frames comprised in the current group of pictures, using a following formula:

$$Isize_{Target} = \frac{Bit_{I,pre}}{Bit_{ave,P,preGOP}} \cdot h(\delta QP_{preGOP} - \delta QP_{Target}),$$

$h(\delta QP_{preGOP} - \delta QP_{Target})$ representing a correction parameter of the current group of pictures, $Isize_{Target}$ representing the target bitrate, $Bit_{I,pre}$ representing an actual bitrate of a previous I frame, and $Bit_{ave,not\ I,preGOP}$ representing an average of actual bitrates of a previous non-I frame; and
   encode the current I frame, based on the target bitrate.

14. The non-transitory computer-readable storage medium according to claim 13, wherein the instructions further cause the at least one processor to:
   calculate a target value of a first quantization parameter difference of the current group of pictures, based on the number of the video frames comprised in the current group of pictures, the first quantization parameter difference being between a first quantization parameter of the current I frame and a second quantization parameter of a current non-I frame;
   calculate a correction value of the correction parameter of the current group of pictures, based on the target value of the first quantization parameter difference and a second quantization parameter difference of a previous group of pictures from the current group of pictures, the second quantization parameter difference being between a first average value of first actual quantization parameters of the previous non-I frame in the previous group of pictures and a second average value of second actual quantization parameters of the previous I frame in the previous group of pictures; and
   correct the target bitrate of the current I frame, based on to the correction value of the correction parameter.

15. The non-transitory computer-readable storage medium according to claim 14, wherein the instructions further cause the at least one processor to:
   compare the number of the video frames comprised in the current group of pictures with a first preset threshold and a second preset threshold, the first preset threshold being greater than the second preset threshold;
   determine the target value of the first quantization parameter difference as a first preset quantization parameter value, based on the number of the video frames comprised in the current group of pictures being less than or equal to the second preset threshold;
   calculate the target value of the first quantization parameter difference, based on a first function, based on the number of the video frames comprised in the current group of pictures being greater than the second preset threshold and less than or equal to the first preset threshold, the number of the video frames comprised in the current group of pictures being input in the first function, and in the first function, when the number of the video frames comprised in the current group of pictures is larger, the target value of the first quantization parameter difference is larger; and
   calculate the target value of the first quantization parameter difference, based on a second function, based on the number of the video frames comprised in the current group of pictures being greater than the first preset threshold, the number of the video frames comprised in the current group of pictures being input in the second function, and in the second function, when the number of the video frames comprised in the current group of pictures is smaller, the target value of the first quantization parameter difference is smaller.

16. The non-transitory computer-readable storage medium according to claim 14, wherein the instructions further cause the at least one processor to:
   calculate a difference $\delta QP_{preGOP} - \delta QP_{Target}$ between an value of an actual quantization parameter $\delta QP_{preGOP}$ of the previous group of pictures and the target value $\delta QP_{Target}$ of the first quantization parameter difference; and
   calculate the correction value of the correction parameter $h(\delta QP_{preGOP} - \delta QP_{Target})$, based on the difference $\delta QP_{preGOP} - \delta QP_{Target}$, using a following formula:

$$h(\delta QP_{preGOP} - \delta QP_{Target}) = \begin{cases} 1 + \lambda \Box \delta QP_{max1} & \delta QP_{preGOP} - \delta QP_{Target} < -\delta QP_{max1} \\ 1 - \lambda \Box \delta QP_{max2} & \delta QP_{preGOP} - \delta QP_{Target} > \delta QP_{max2} \\ 1 - \lambda \Box (\delta QP_{preGOP} - \delta QP_{Target}), & \delta QP_{max1} \leq \delta QP_{preGOP} - \delta QP_{Target} \leq \delta QP_{max2} \end{cases},$$

$\delta QP_{max1}$ representing a first preset value, $\delta QP_{max2}$ representing a second preset value, and $\lambda$ representing a third preset value.

17. The non-transitory computer-readable storage medium according to claim 13, wherein the instructions further cause the at least one processor to control to play the current group of pictures, based on the current I frame that is encoded.

* * * * *